United States Patent
Edpalm (10) Patent No.: US 11,153,561 B2
(45) Date of Patent: Oct. 19, 2021

(54) VIDEO ENCODING METHOD AND VIDEO ENCODER CONFIGURED TO PERFORM SUCH METHOD

(71) Applicant: Axis AB, Lund (SE)

(72) Inventor: Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/037,820

(22) Filed: Sep. 30, 2020

(65) Prior Publication Data

US 2021/0120238 A1 Apr. 22, 2021

(30) Foreign Application Priority Data

Oct. 16, 2019 (EP) ...................................... 19203656

(51) Int. Cl.
*H04N 7/12* (2006.01)
*H04N 19/115* (2014.01)
(Continued)

(52) U.S. Cl.
CPC .......... *H04N 19/115* (2014.11); *H04N 19/136* (2014.11); *H04N 19/146* (2014.11); *H04N 19/172* (2014.11); *H04N 19/593* (2014.11)

(58) Field of Classification Search
CPC .. H04N 19/115; H04N 19/593; H04N 19/146; H04N 19/172; H04N 19/136;
(Continued)

(56) References Cited

U.S. PATENT DOCUMENTS

| | | | | |
|---|---|---|---|---|
| 8,254,469 | B2* | 8/2012 | Au | H04N 19/39 |
| | | | | 375/240.27 |
| 2006/0078051 | A1* | 4/2006 | Liang | H04N 19/14 |
| | | | | 375/240.24 |
| 2012/0099645 | A1* | 4/2012 | Bekiares | H04N 21/4325 |
| | | | | 375/240.12 |
| 2013/0114697 | A1* | 5/2013 | Siddaramanna | H04N 19/124 |
| | | | | 375/240.03 |

(Continued)

FOREIGN PATENT DOCUMENTS

| | | |
|---|---|---|
| EP | 3021579 A1 | 5/2016 |
| JP | 2007-221411 A2 | 8/2007 |
| WO | 2010/069427 A1 | 6/2010 |

OTHER PUBLICATIONS

Extended European Search Report dated Mar. 17, 2020 for the European Patent Application No. 19203656.4.

(Continued)

*Primary Examiner* — Gims S Philippe
(74) *Attorney, Agent, or Firm* — Volpe Koenig (57) ABSTRACT

A video encoding method for encoding a series of images of original video data into an encoded video, comprises setting a periodic intra refresh pattern for the encoding of the series of images; setting a number of delta frames to be added between consecutive intra refresh frames of the periodic intra refresh pattern, thereby adjusting the intra refresh periodicity of the encoded video stream; and encoding the series of images of original video data into the encoded video stream using the set periodic intra refresh pattern and the set number of delta frames to be added between consecutive intra refresh frames. During the encoding, a current intra refresh frame is set to directly refer to a previous intra refresh frame and each delta frame added in between two consecutive intra refresh frames is set to only refer to a previous one of the two consecutive intra refresh frames.

8 Claims, 4 Drawing Sheets

(51) Int. Cl.
*H04N 19/136* (2014.01)
*H04N 19/146* (2014.01)
*H04N 19/172* (2014.01)
*H04N 19/593* (2014.01)

(58) Field of Classification Search
CPC .... H04N 19/159; H04N 19/44; H04N 19/503; H04N 21/4325; H04N 19/114; H04N 19/39; H04N 19/40; H04N 19/436; H04N 19/587; H04N 19/61; H04N 21/23439; H04N 21/2365; H04N 21/4147; H04N 21/812
USPC ..................................................... 375/240.12
See application file for complete search history.

(56) References Cited

U.S. PATENT DOCUMENTS

| 2017/0013274 A1* | 1/2017 | Sadhwani | H04N 19/164 |
| 2017/0099491 A1* | 4/2017 | Lei | H04N 19/507 |
| 2017/0105010 A1* | 4/2017 | Wu | H04N 21/8451 |

OTHER PUBLICATIONS

Chen et al., "Adaptive intra-refresh for low-delay error-resilient video coding," Signal and Information Processing Association Annual Summit and Conference (APSIPA), 2014 Asia-Pacific, Siem Reap, pp. 1-4 (2014).
Erol et al., "CHAPTER 10—MPEG-4 Visual and H.264/AVC: Standards for Modern Digital Video." (2009).

* cited by examiner

VIDEO ENCODING METHOD AND VIDEO ENCODER CONFIGURED TO PERFORM SUCH METHOD

TECHNICAL FIELD

The present invention relates to video encoding method for encoding a series of images of original video data into an encoded video stream. Also, a video encoder configured to perform the video encoding method is presented.

BACKGROUND

A common problem with video encoding using H.264 encoding (and similar standards) is the I-frame bitrate spike originating from that I-frames comprises much more information than P- and/or B-frames. This problem is particularly present for network monitoring cameras being configured to transmit encoded video streams on a network, and particularly if there are several cameras arranged on the same network. Ideally, the network would prefer a constant bitrate.

Figure 1A:
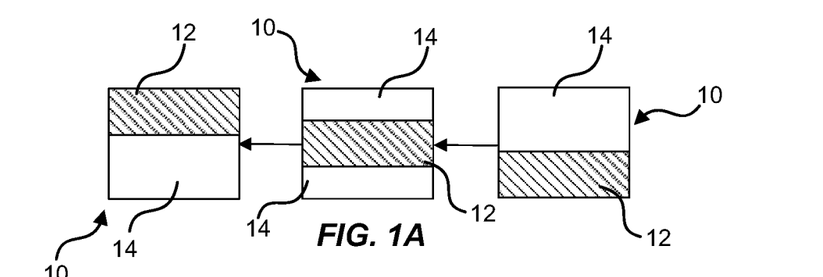
FIGS. 1A-C schematically illustrates examples of intra refresh patterns for an intra refresh encoded video stream.
Figure 1B:
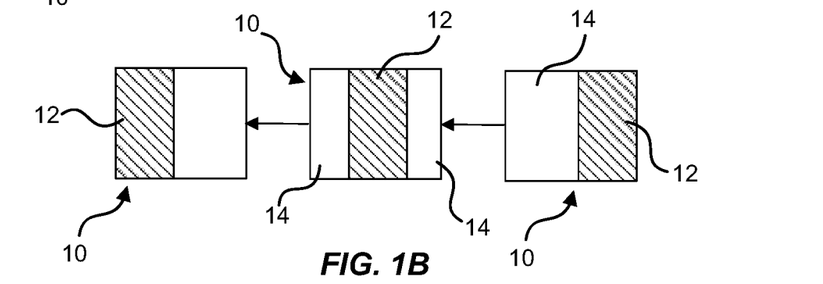
Figure 1C:
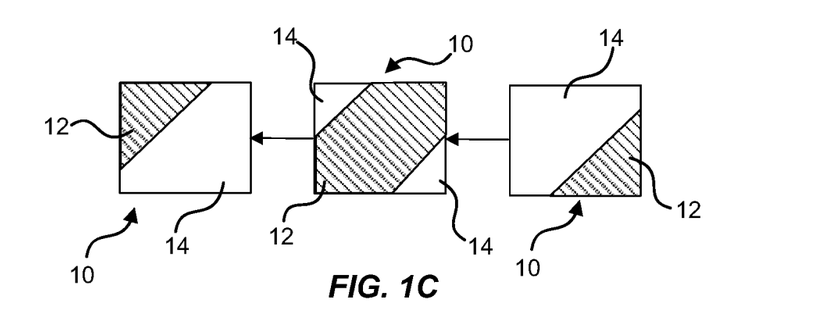

One solution to reduce the bitrate spike is to spread the I-frame over a plurality of image frames and instead have a part (an intra refresh region) of each image frame forced to be encoded as I-blocks. The intra refresh region is moved across the image frame over a set of image frames, thereby "refreshing" the image. This method is called periodic intra refresh or just intra refresh. Hence, by applying intra refresh the spikes in bitrate, that otherwise would occur once per GOP, i.e. when an image frame is encoded just using intra-encoding, may be smeared out over multiple frames. In the intra refresh, a periodic intra refresh pattern is used for defining which part of an image frame that should be "refreshed" (i.e. encoded without reference to any other image frame), thus forced to be encoded as an intra-coded region. Different examples of intra refresh patterns are illustrated in connection with FIGS. 1A-C, illustrating intra refresh encoded frames 10 of a video stream. In the examples a dashed area represents an intra refresh region 12, and an unfilled area represents a remaining inter encoded portion 14 of the intra refresh encoded frame 10. In the FIG. 1A example, a periodic intra refresh pattern is shown where complete rows or slices of macroblocks in the intra refresh encoded frame 10 defines an intra refresh region 12. In the FIG. 1B example, a periodic intra refresh pattern is shown where complete column(s) or tiles of macroblocks in the intra refresh encoded frame 10 defines an intra refresh region 12. Other ways of defining the periodic intra refresh pattern are equally possible. FIG. 10 shows by way of example one such alternative. According to this example a periodic intra refresh pattern is defined by a diagonal intra refresh region 12 moving from one corner of the intra refresh encoded frame 10 to the opposite corner. In all examples of intra refresh patterns, all defined macroblocks of pixels of an encoded image frame have been intra refreshed during a cycle of the pattern, i.e. over the n image frames (n=3 in these examples) for which a cycle of the intra refresh pattern extends. In the examples of periodic intra refresh patterns illustrated in connection with FIGS. 1A-C, the intra refresh regions 12 in the patterns have some overlap. However, according to other examples there is no overlap between the intra refresh regions 12

Each illustrated example includes three intra refresh encoded frames 10 for the entire encoded image frame to be refreshed, but it should be understood that in a typical case, an intra refresh pattern cycles over a greater number of encoded image frames, such as 68, 34, 23, 17, 14, 11, 10.

The ability to dynamically adjust the number of encoded image frames within a period of an intra refresh pattern is highly valuable for some applications, especially for monitoring applications wherein a relatively large number of encoded image frames are preferred during times of no (or little) level motion in the scene depicted in the encoded video stream and a relatively low number of encoded image frames are preferred during times of relatively high level of motion in the scene depicted in the encoded video stream. In intra refresh, a known way to modify the number of encoded image frames is to vary the number of rows or columns to intra code in each frame. For example, for a 68-macroblock high video (FHD video), the maximum number of encoded image frames is limited to 68 (if one row of macroblocks is used for each intra refresh frame). However, for some applications, e.g. monitoring applications, a much higher number of encoded image frames is sometimes desired.

Hence, there is a need in providing improved dynamic adjustment in the number of encoded image frames in a cycle of an intra refresh coded video stream.

SUMMARY

Mitigating, alleviating or eliminating one or more of the above-identified deficiencies in the art and disadvantages singly or in any combination and at least partly solve the above-mentioned problem(s) would be beneficial.

According to a first aspect a video encoding method for encoding a series of images of original video data into an encoded video stream is provided. The method comprises: setting a periodic intra refresh pattern for the encoding of the series of images of original video data; setting a number of delta frames to be added between consecutive intra refresh frames of the periodic intra refresh pattern, thereby the intra refresh periodicity of the encoded video stream is adjusted; and encoding the series of images of original video data into the encoded video stream using the set periodic intra refresh pattern and the set number of delta frames to be added between consecutive intra refresh frames. During the encoding, a current intra refresh frame is set to directly refer to a previous intra refresh frame. During the encoding, each delta frame added in between two consecutive intra refresh frames is set to only refer to a previous one of the two consecutive intra refresh frames.

The present method allows for adjusting the number of frames in an intra fresh cycle. This by allowing a number of delta frames to be added in between consecutive intra refresh frames. The present method may be easy to implement using available encoding standards. Hence, the present method allows for adaptive video encoding, wherein the number of encoded frames in an intra refresh cycle may be dynamically adjusted.

In other words, by applying a hierarchical coding scheme to the intra refresh pattern by adding the delta frames in between two consecutive intra refresh frames the number of frames in an intra fresh cycle may be adjusted. This allows for adjusting the number of frames in an intra-refresh cycle beyond the limitations of using intra-refresh frames only.

The method may further comprise determining a level of motion in the original video data. The number of delta frames to be added may set based on the determined level of motion. A relatively high level of motion may result in a relatively low number of delta frames. A relatively low level of motion may result in a relatively high number of delta frames. Hence, a number of frames for a specific intra refresh cycle may be deduced based on the level motion in the scene.

The set number of delta frames between consecutive intra refresh frames of an intra refresh cycle may be the same.

The set number of delta frames may be adjusted for a subsequent intra refresh cycle as compared with a previous intra refresh cycle. The adjustment may be made based on the determined level of motion. Hence, the number encoded frames in the intra-refresh cycle may be adjusted as a result of a change in an imaged scene. Alternatively, or in combination, the adjustment may be based on bitrate allocation for the encoded video stream. For example, the bitrate of the encoded video stream may be decreased by increasing the set number of delta frames. This may e.g. be useful for situations where the network has a limited bandwidth availability due to a temporary demand. Alternatively, or in combination, the number of delta frames may be adjusted due to lost packages or due to a desire for a more stable stream (e.g. an important event was triggered). Typically, for such situations the number of delta frames is decreased.

Each frame, delta frame or intra refresh frame, may corresponds to an image of the series of images of original video data.

According to a second aspect a non-transitory computer-readable storage medium is provided. The non-transitory computer-readable storage medium having stored thereon instructions for implementing the video encoding method according to the first aspect, when executed on a device having processing capabilities.

The above mentioned features of the method according to the first aspect, when applicable, apply to this second aspect as well. In order to avoid undue repetition, reference is made to the above.

According to a third aspect a video encoder configured to encode a series of images of original video data into an encoded video stream is provided. The video encoder is configured to: set a periodic intra refresh pattern for the encoding of the series of images of original video data; set a number of delta frames to be added between consecutive intra refresh frames of the periodic intra refresh pattern, thereby increasing the intra refresh periodicity of the encoded video stream; and encode the series of images of original video data into the encoded video stream using the set periodic intra refresh pattern and the set number of delta frames to be added between consecutive intra refresh frames. During the encoding the encoder is configured to set a current intra refresh frame to directly refer to a previous intra refresh frame—Further, during the encoding, the encoder is configured to set each delta frame added in between two consecutive intra refresh frames to only refer to a previous one of the two consecutive intra refresh frames.

The video encoder may be implemented in a video camera.

The above mentioned features of the method according to the first aspect, when applicable, apply to this third aspect as well. In order to avoid undue repetition, reference is made to the above.

A further scope of applicability of the present system and method will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that this system and method set forth herein are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present teachings will be set forth more fully hereinafter with reference to the accompanying drawings, in which currently preferred embodiments are shown. The teachings may, however, be embodied in many different forms and should not be construed as limited to the embodiments set forth herein; rather, these embodiments are provided for thoroughness and completeness, and to fully convey the scope of the teachings to the skilled person.

Figure 2:
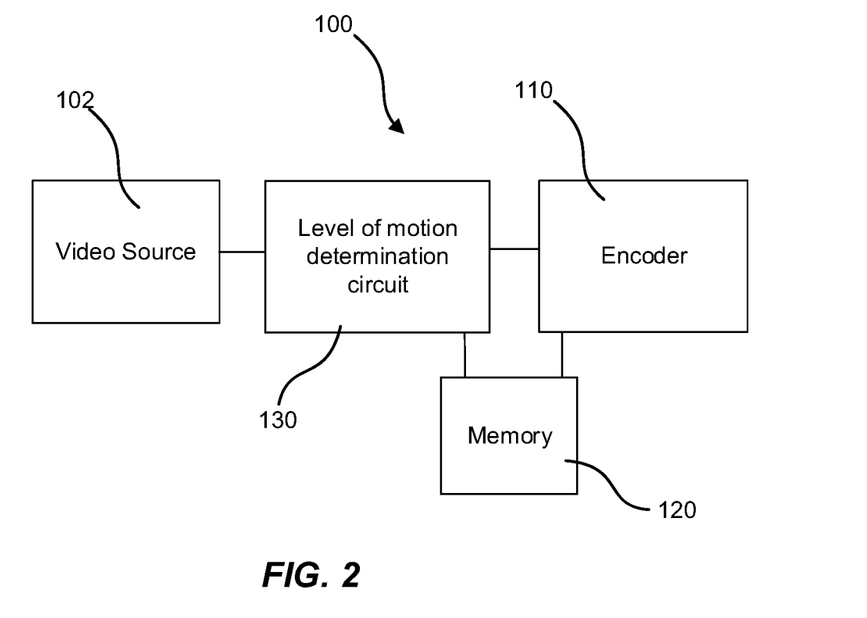
FIG. 2 schematically illustrates a video encoding system.

In connection with FIG. 2 a video encoding system 100 is illustrated. The video encoding system 100 comprises a video source 102, a video encoder 110 and a memory 120. The video encoder 110 is configured to encode a series of images of video data into an encoded video stream. The video data in the form of a series of images is received from the video source 102. The video source 102 may be an image sensor. The video encoder 110 may be set to use any suitable encoding scheme. Non-limiting examples are H.264, H.265 and AV1. The video encoder 100 may be in communication with the memory 120. The memory 120 may be used as a buffer memory during the encoding of the video data. The memory 120 may comprise one of more memory portions. A specific memory portion may be a volatile memory portion. A specific memory portion may be a non-volatile memory portion. Hence, the memory 120, may comprise both volatile and non-volatile memory portions.

Figure 3:
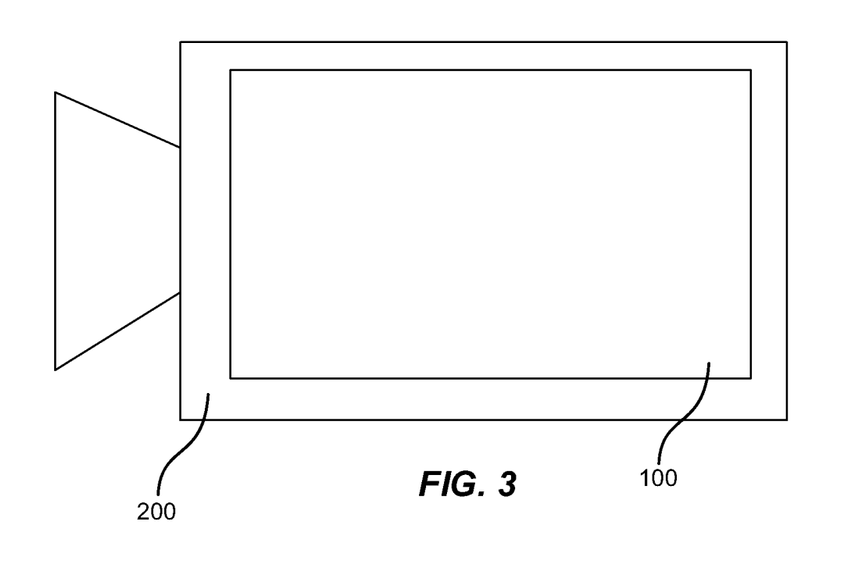
FIG. 3 schematically illustrates a camera comprising the video encoding system of FIG. 2.

As illustrated in FIG. 3, the video encoding system 100 may be implemented in a video camera 200. The video camera 200 may be digital video camera. The video camera 200 may be a monitoring camera.

The video encoder 110 is configured to encode the series of images of the video data into an encoded video stream. The video encoder 110 is configured to encode the video stream using intra refresh. As discussed in connection with the background section, in the intra refresh, a periodic intra refresh pattern is used for defining which part of an encoded image frame that should be "refreshed" (i.e. encoded without reference to any other image frame), thus forced to be encoded as an intra-coded region. Hence, the encoder is configured to set a periodic intra refresh pattern to be used to encode the series of images of video data into the encoded video stream.

This far the video encoder 110 is set to encode in accordance with already known encoding schemes. However, the video encoder 110 is further configured to add delta frames between consecutive intra refresh frames of the periodic intra refresh pattern. A delta frame is a frame that only comprises changes that occur from one frame to the next. Hence, delta frames typically comprise less data than intra refresh frames. In video encoding a delta frame is also known as an inter frame, often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame.

The video encoder 110 is hence configured to set a number of delta frames to be added between consecutive intra refresh frames of the periodic intra refresh pattern. By adding the delta frames the intra refresh periodicity of the encoded video stream will be adjusted. Hence, the number of frames within an intra refresh cycle will be adjusted. Typically, the intra refresh periodicity will be increased, especially compared to the prior art intra refresh method discussed in the background section. Hence, the number of frames within an intra refresh cycle will be increased. This gives the ability to more freely adjust the number of frames within an intra refresh cycle.

The setting of the periodic intra refresh pattern for the encoding of the series of images of original video data may be made by selecting a number of intra refresh frames in the periodic intra refresh pattern. The selecting may be made by accessing a list of predetermined number of frames for an intra-refresh cycle given pixel properties of the images of original video data.

During the encoding, the video encoder 110 is set to set a current intra refresh frame to directly refer to a previous intra refresh frame. Further, the video encoder 110 may be set to set a current intra refresh frame to only refer to a previous intra refresh frame, hence, an intra refresh frame is only referring to another intra refresh frame and not to a delta frame. By this scheme of referring intra refresh frames the benefits from prior art intra refresh encoding is sustained. By an intra refresh frame is only referring to another intra refresh frame and not to a delta frame it may be secured that motion vector is not extending out from the intra refresh region. Further, by using this type of hieratical structure of the frames is that one or more "layers" of delta frames may be easily deleted from the encoded video stream and at the same time the encoded video stream will still be decodable after deletion of one or more "layers" of delta frames.

Further, during the encoding, the video encoder 110 is configured to set each delta frame added in between two consecutive intra refresh frames to only refer to a previous one of the two consecutive intra refresh frames. Such configuration of the encoding is a normal configuration used for encoding video streams and hence using this configuration all standard encoders may be used.

An example of a frame structure of an encoded video stream in accordance with the present teachings is schematically illustrated in connection with FIG. 4. The encoded video stream comprises both intra refresh encoded frames 10 and delta frames 16. In the illustrated example the delta frames 16 are P-frames. In the illustrated example the frame structure of an encoded video stream during one intra refresh cycle is illustrated. However, it is to be understood that the encoded video stream may comprise more than one intra refresh cycle. Further, in the illustrated example the intra refresh cycle comprises three intra refresh encoded frames 10, but it should be understood that in a typical case, an intra refresh pattern cycles over a greater number of encoded image frames, such as 68, 34, 23, 17, 14, 11, 10. Each intra refresh encoded frame 10 comprises an intra refresh region 12, illustrated as a dashed area, and a remaining inter encoded portion 14, illustrated as an unfilled area. The periodic intra refresh pattern is shown where complete rows or slices of macroblocks in the intra refresh encoded frame 10 defines an intra refresh region 12. However, alternative ways of defining the periodic intra refresh pattern may be equally possible. Some such examples of the intra refresh pattern are illustrated in connection with FIGS. 1B and 10.

Figure 4:
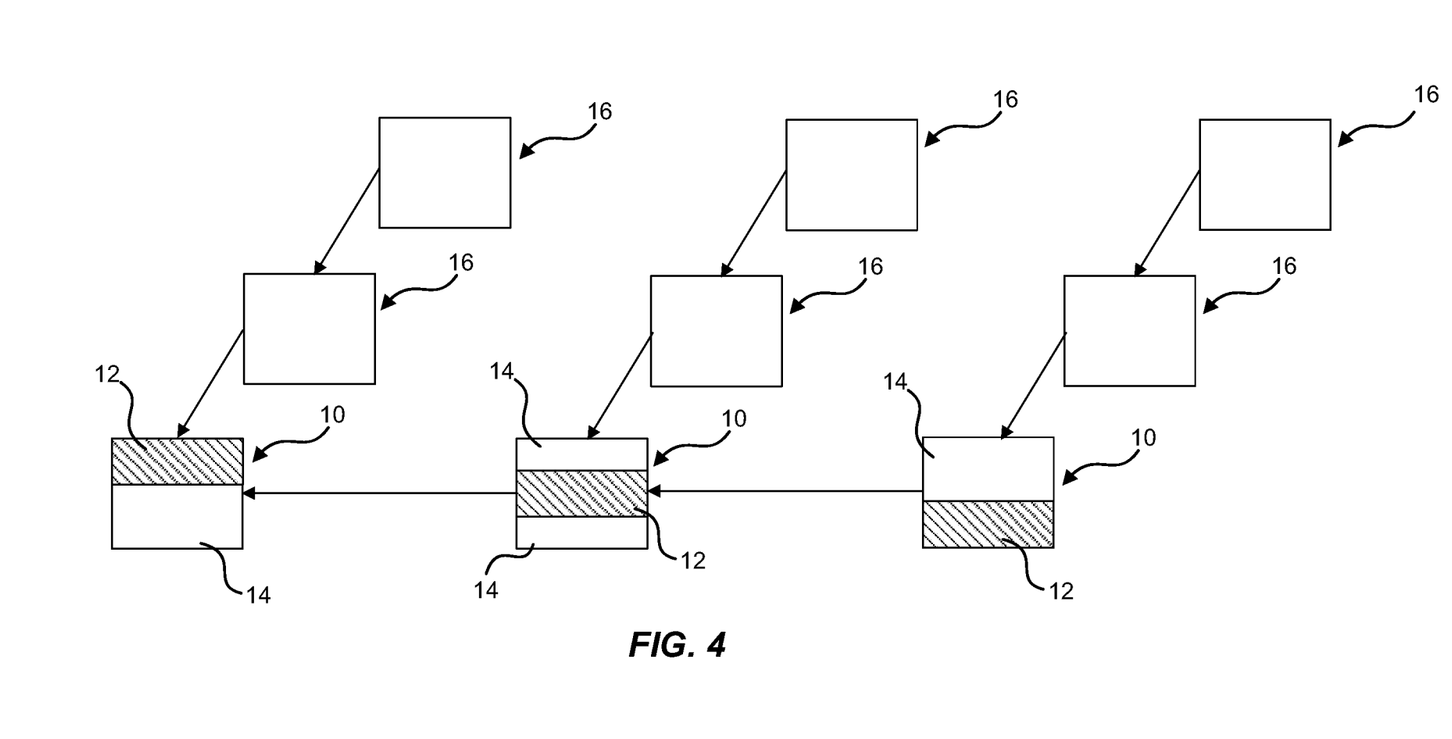
FIG. 4 schematically illustrates a frame structure of an encoded video stream in accordance with the present teachings.

Further, in connection with FIG. 4 the intra refresh regions 12 in the intra refresh pattern is illustrated as having some overlap. However, according to other examples there is no overlap between the intra refresh regions 12.

The video encoder may be configured to encode the series of images of original video data such that each frame, delta frame or intra refresh frame, corresponds to an image of the series of images of original video data.

The number of delta frames to be added may be set based on a level of motion in the original video data. The level of motion is a measure of an amount of change in image data of an image of the original video data as compared to an image of a previous image in the series of images in the original video data. It may be said that the level of motion is a measure of an amount of forefront video information being present in the video data. The level of motion may be determined using a global change value, CG as described in EP3021579 A1, see especially [0035]-[0041]. However, the level of motion may be determined in alternative ways. Some non-limiting examples are to use statistics from a temporal noise filter, to use an average size of motion vectors used during the encoding, or to perform a pixel to pixel comparison.

Hence, the video encoding system 100 may further comprise a level of motion determination circuitry 130. The level of motion determination circuitry 130 is configured to determine level of motion in the original video data. The level of motion determination circuitry 130 may be configured to determine the level of motion in the original video data based on any of the above-mentioned methods. The level of motion determination circuitry 130 may include a processor, such as a central processing unit (CPU), microcontroller, or microprocessor. The processor is configured to execute program code stored in the memory 120, in order to carry out functions of the level of motion determination circuitry 130. Functions of the level of motion determination circuitry 130 may be embodied in the form of executable logic routines (e.g., lines of code, software programs, etc.) that are stored on a non-transitory computer readable medium (e.g., the memory 120) and are executed by the level of motion determination circuitry 130 (e.g., using the processor).

Furthermore, the functions of the level of motion determination circuitry 130 may be a stand-alone software application or form a part of a software application that carries out additional tasks related to the level of motion determination circuitry 130. The described functions may be considered a method that the corresponding device is configured to carry out. Also, while the described functions may be implemented in software, such functionality may as well be carried out via dedicated hardware or firmware, or some combination of hardware, firmware and/or software.

The video encoder 110 may hence determine the number of delta frames to be added based on the level of motion in the original video data. A relatively higher level of motion may be used to set a relatively lower number of delta frames. A relatively lower level of motion may be used to set a relatively higher number of delta frames.

The video encoder 110 may be configured to the set the number of delta frames between consecutive intra refresh frames of an intra refresh cycle to be the same.

The video encoder 110 may be configured to adjust the set number of delta frames for a subsequent intra refresh cycle as compared with a previous intra refresh cycle. Hence, the number of frames in an intra refresh cycle may be adjusted throughout the encoded video stream. Again, the number of delta frames may be set based on the level of motion in the scene, if the level of motion in the scene is changing the number of delta frames in the encoded video stream may also be changed.

Figure 5:
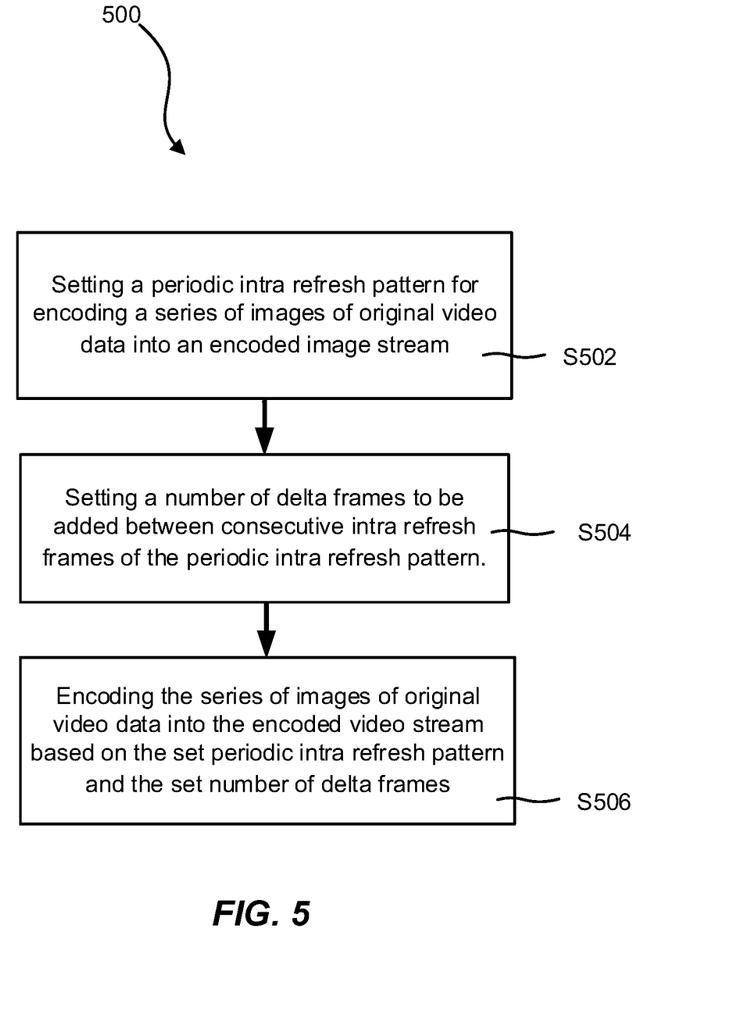
FIG. 5 is a block scheme of a video encoding method for gaining the frame structure illustrated in FIG. 4.

In connection with FIG. 5 a video encoding method 500 configured to encode a series of images of original video data into an encoded video stream will be discussed. The video encoding method may be configured to encode video data captured by a camera. The camera may be a monitoring camera. The video processing method comprises the following steps/acts.

Setting S502 a periodic intra refresh pattern for the encoding of the series of images of original video data. The setting S502 of the periodic intra refresh pattern for the encoding of the series of images of original video data may be made by selecting a number of intra refresh frames in the periodic intra refresh pattern. The selecting may be made by accessing a list of predetermined number of frames for an intra-refresh cycle given pixel properties of the images of original video data. The selecting may be made based on a level of motion in the scene depicted by the encoded video stream.

Setting S504 a number of delta frames to be added between consecutive intra refresh frames of the periodic intra refresh pattern. Thereby the intra refresh periodicity of the encoded video stream may be adjusted. The set number of delta frames between consecutive intra refresh frames of an intra refresh cycle may be the same. The set number of delta frames may be adjusted for a subsequent intra refresh cycle as compared with a previous intra refresh cycle.

Encoding S506 the series of images of original video data into the encoded video stream using the set periodic intra refresh pattern and the set number of delta frames to be added between consecutive intra refresh frames. During the encoding S506, a current intra refresh frame is set to directly refer to a previous intra refresh frame. During the encoding S506, each delta frame added in between two consecutive intra refresh frames is set to only refer to a previous one of the two consecutive intra refresh frames. Each encoded frame, delta frame or intra refresh frame, may correspond to an image of the series of images of original video data.

The method may further comprise determining a level of motion in the original video data. During the act of setting S504, the number of delta frames to be added may be set based on the determined level of motion. A relatively high level of motion may result in a relatively low number of delta frames. A relatively low level of motion may result in a relatively high number of delta frames.

The person skilled in the art realizes that the present teachings by no means are limited to the preferred embodiments described above. On the contrary, many modifications and variations are possible within the scope of the appended claims. For example, the delta frames added in between two consecutive intra refresh frames may be organized in a hierarchical prediction pattern comprising a plurality of temporal layers.

Additionally, variations to the disclosed embodiments can be understood and effected by skilled persons in practicing the claims, from a study of the drawings, the disclosure, and the appended claims.

The invention claimed is:

1. A video encoding method for encoding a series of images of original video data into an encoded video stream, the method comprising:
    setting a periodic intra refresh pattern for the encoding of the series of images of the original video data, wherein the periodic intra refresh pattern defines which region of an intra refresh frame should be forced to be encoded as an intra-coded region, so that all regions of an image are intra refreshed over a set of intra refresh frames in one cycle of the periodic intra refresh pattern;
    setting a number of delta frames to be added between consecutive intra refresh frames of the periodic intra refresh pattern, thereby adjusting the intra refresh periodicity of the encoded video stream; and
    encoding the series of images of the original video data into the encoded video stream based on the adjusted intra refresh periodicity, using the set periodic intra refresh pattern and the set number of delta frames, added between consecutive intra refresh frames,
    wherein, during the encoding, a current intra refresh frame is set to refer only to a previous intra refresh frame for prediction, and
    wherein, during the encoding, each delta frame, added in between two consecutive intra refresh frames, is set to only directly or indirectly, via one or more of the delta frames added in between the two consecutive intra refresh frames, refer to a previous one of the two consecutive intra refresh frames for prediction.

2. The method according to claim 1, further comprising determining a level of motion in the original video data, wherein the number of delta frames to be added is set based on the determined level of motion, wherein a relatively high level of motion results in a relatively low number of delta frames and wherein a relatively low level of motion results in a relatively high number of delta frames.

3. The method according to claim 1, wherein the set number of delta frames between consecutive intra refresh frames of an intra refresh cycle is the same.

4. The method according to claim 1, wherein the set number of delta frames is adjusted for a subsequent intra refresh cycle as compared with a previous intra refresh cycle.

5. The method according to claim 1, wherein each frame, delta frame or intra refresh frame, corresponds to an image of the series of images of original video data.

6. A non-transitory computer-readable storage medium having stored thereon instructions for implementing the video encoding method according to claim 1, when executed on a device having processing capabilities.

7. A video encoder configured to encode a series of images of original video data into an encoded video stream, the video encoder is configured to:
- set a periodic intra refresh pattern for the encoding of the series of images of the original video data, wherein the periodic intra refresh pattern defines which region of an intra refresh frame should be forced to be encoded as an intra-coded region, so that all regions of an image are intra refreshed over a set of intra refresh frames in one cycle of the periodic intra refresh pattern;
- set a number of delta frames to be added between consecutive intra refresh frames of the periodic intra refresh pattern, thereby increasing the intra refresh periodicity of the encoded video stream; and
- encode the series of images of the original video data into the encoded video stream based on the increased intra refresh periodicity using the set periodic intra refresh pattern and the set number of delta frames, added between consecutive intra refresh frames,
- during the encoding the video encoder is configured to set a current intra refresh frame to refer only to a previous intra refresh frame for prediction,
- during the encoding the video encoder is configured to set each delta frame, added in between two consecutive intra refresh frames, to only directly or indirectly, via one or more of the delta frames added in between the two consecutive intra refresh frames, refer to a previous one of the two consecutive intra refresh frames for prediction.

8. The video encoder according to claim 7, implemented in a video camera.

* * * * *